July 21, 1942.  T. A. ABBOTT  2,290,724
VOLT-AMPERE MEASUREMENT

Filed July 25, 1941  2 Sheets-Sheet 1

Inventor:
Thomas A. Abbott,
by Harry E. Dunham
His Attorney.

July 21, 1942.  T. A. ABBOTT  2,290,724
VOLT-AMPERE MEASUREMENT
Filed July 25, 1941  2 Sheets-Sheet 2

Inventor:
Thomas A. Abbott,
by Harry E. Dunham
His Attorney.

Patented July 21, 1942

2,290,724

UNITED STATES PATENT OFFICE 2,290,724

VOLT-AMPERE MEASUREMENT

Thomas A. Abbott, Marblehead, Mass., assignor to General Electric Company, a corporation of New York Application July 25, 1941, Serial No. 403,967

6 Claims. (Cl. 171—34)

My invention relates to the measurement of volt-amperes or volt-ampere hours of alternating current power circuits, and its object is to provide volt-ampere measuring apparatus using a standard induction meter element with regulating apparatus in its voltage circuit for obtaining a pulsating current proportional to the voltage of the metered circuit but in a fixed phase relation with the current of the metered circuit.

Figure 1:
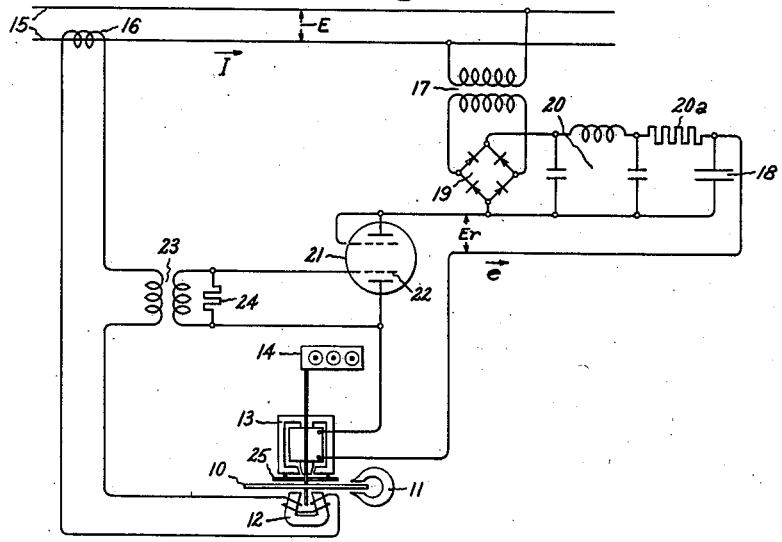
Figure 2:
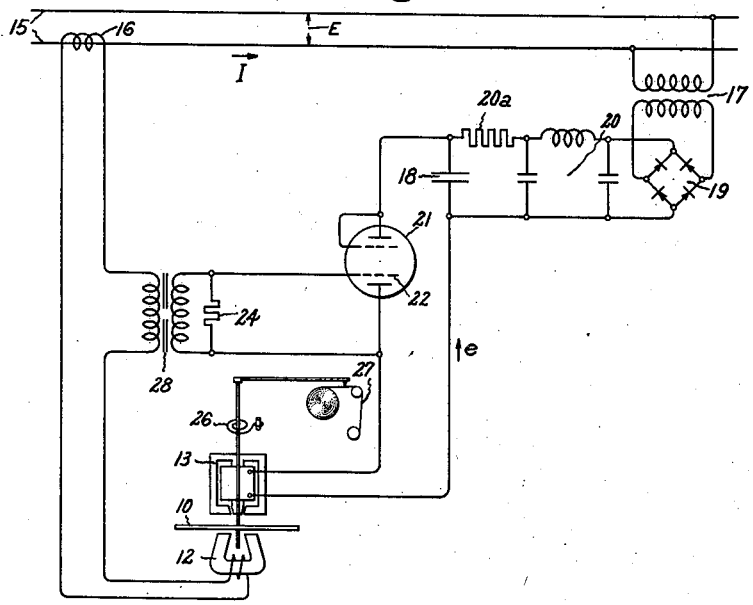
Figures 3, 4:
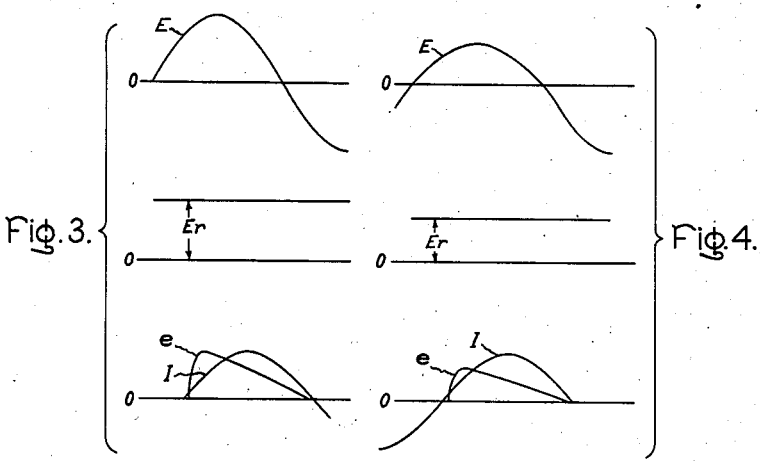
Figure 5:
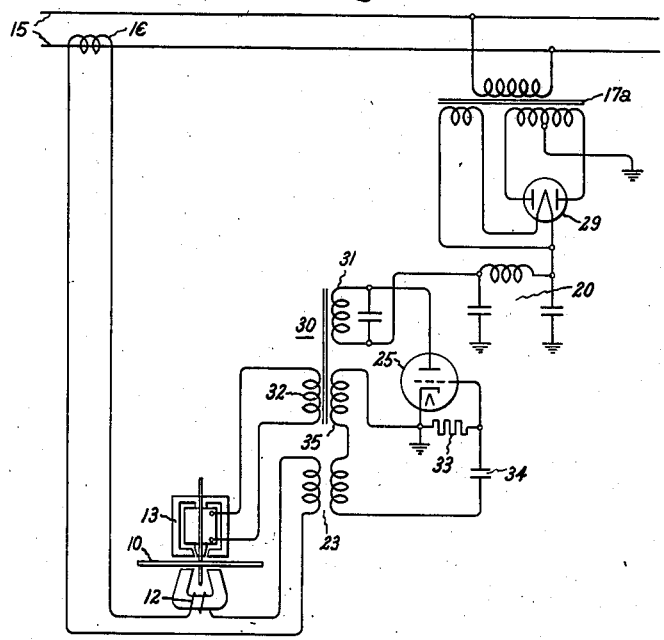

The features of my invention which are believed to be novel and patentable will be pointed out in the claims appended hereto. For a better understanding of my invention reference is made in the following description to the accompanying drawings in which Fig. 1 represents an embodiment of my invention as connected for the measurement of the volt-ampere hours of a single phase circuit. Fig. 2 represents a slightly modified embodiment of the invention. Fig. 3 represents voltage and current relations for one value of voltage and Fig. 4 shows the same relations for a lower value of voltage. Fig. 5 represents an embodiment of the invention employing a plate modulated oscillation for supplying the voltage current impulses.

According to my invention I employ a standard form of induction wattmeter device represented in Fig. 1 as of the integrating type having an induction driving disk 10, a permanent drag magnet 11, a current magnet 12 and voltage magnet 13. 14 represents the register which may include a demand attachment if desired. Such a meter, as represented, will measure watthours if its current and voltage coils are energized by and in phase with the current and voltage of a power circuit.

My invention relates to control apparatus associated with the current and voltage circuits of the meter for causing the meter measurement to be proportional to volt-amperes instead of watts. As seen in Fig. 1 the current magnet 12 of the meter is energized in the usual way in phase with and proportional to the current flowing in the power circuit 15, generally through a current transformer represented at 16. The voltage magnet 13 of the meter is energized from a voltage derived from and which is proportional to the voltage of the power circuit 15, but the phase of which is controlled so as to be in a fixed phase relation with the current of the power circuit. In the arrangement shown a voltage transformer 17 supplies current to a condenser at 18 through a rectifier 19. 20 represents a filter and 20a a current limiting resistor. Current is supplied from condenser 18 to voltage coil 13 in pulsations which are in fixed phase relation with the current of the metered circuit. This may be accomplished by providing a tube valve 21 in the supply circuit between magnet 13 and condensers 18 and controlling the conductivity of the valve by a control voltage which is in fixed phase relation with the current of the metered circuit. An electron discharge tube suitable for this purpose is made by General Radio Company and called the Strobotrone tube. Such a tube is rendered conductive by a small positive biasing voltage on its control grid 22. It remains conductive so long as the positive grid voltage is maintained at or exceeds the trip value and the plate voltage is maintained and is rendered non-conducting when plate voltage is reduced below a value to maintain the discharge. The conductivity of the tube is independent of variations in the grid bias voltage above the trip value so that the current flow through the tube while conductive, is proportional to the voltage of the supply source, in this case the voltage across condenser 18. In order to trip tube 21 in fixed phase relation with the current supplied to current magnet 12, I provide a transformer 23 in the current circuit and obtain a bias voltage from its secondary circuit. A resistance 24 is also provided across the secondary of this transformer. The connections are such that the grid 22 of tube 21 is biased by the voltage across resistance 24.

Consider now Fig. 3. The curve E may represent the voltage across line 15. After rectification by rectifier 19 the direct current voltage across condenser 18 may be represented by the distance Er above the zero line. Let I represent the current supplied from transformer 16. When the phase of this current is such as to make grid 22 positive, the tube 21 becomes conducting so that e may then represent the average value of one of the direct current pulsations supplied to voltage magnet 13 of the meter. Such pulsations occur only during that half cycle of the current I when grid 22 is positive and are in fixed phase relation with the current I and are proportional to the voltage E. The resistance at 20a is such that when the condenser 18 is discharged through tube 21 the condenser is prevented from recovering its charge immediately, and hence tube 21 becomes non-conducting during the other half cycle. The design of transformer 23 can easily be made such that even for very small values of current I the tube 21 is tripped so that the duration of the direct current pulsations e are independent of the magnitude of current I, within the desired current variation measurement range. Fig. 4 represents the same relations as Fig. 3 except for a lower line voltage E. It is evident that the current pulsations e are substantially proportional to voltage E, are independent of variations in phase relation between the current and voltage of line 15, occur in a fixed phase relation with current I and are independent of the magnitude of I above a very small value. Since the direct current supplied to magnet 13 is in the form of pulsations proportional to E, the voltage flux produced will have the same kind of induction torque-producing effect as if produced by an equivalent alternating current except for some possible wave form difference. Since, however, the voltage of line 15 will ordinarily not vary over a wide range, the wave form, whatever its character, will remain sufficiently constant that the meter may be readily calibrated to measure volt-ampere hours. In any case where conditions warrant, the direct current pulsations could be changed to an equivalent alternating current by a transformer. The voltage flux which is effective in producing torque can be shifted to a torque-producing phase relation with respect to the current flux by the usual voltage flux lagging expedient represented by a lag plate 25.

In Fig. 2 I have represented a modification of the invention having parts similar to those of Fig. 1 represented by like reference characters. Incidentally, to illustrate that the invention may be used to measure volt-amperes as well as volt-ampere hours, I have represented the induction meter as having its rotary disk 10 restrained by a spring 26 so as to produce a deflection which may be recorded in terms of volt-amperes on a chart represented at 27. The essential difference between Figs. 1 and 2 concerns the nature of the transformer which is used to trip the tube 21 in fixed phase relation with the current supplied to current magnet 12.

In the induction form of meter the most effective torque producing relation between the torque producing current and voltage flux components is a 90 degree relation. When these flux components are exactly in phase the torque is zero. In Fig. 1, with an ordinary transformer at 23, a useful torque producing flux relation of the meter may be obtained primarily by means of the lag plate 25 and the design of the voltage electromagnet. The phase angle error of the transformer 23 and any minor shift of phase due to the performance of tube 21 and the constants of the circuit in which magnet 13 is included may be such as to aid in obtaining the desired phase shift. However, a more nearly ideal torque producing phase relation between the meter fluxes and a higher efficiency installation may be had by employing a transformer 28, Fig. 2, which has an air gap in its magnetic circuit. This produces a secondary voltage approaching a 90 degree relation with respect to the primary current so that the tube 21 is tripped in a fixed but more suitable phase relation with respect to the current of the magnet 12. In Fig. 2 it will be possible to dispense with a phase shifting lag plate entirely although one may be used for minor phase shift adjustment purposes.

A refinement that may be used in both modifications is to employ a resistance device at 24 having, to a desired extent, the characteristic of reducing its resistance with increase in current through it. Then the voltage bias of tube 21 will tend to remain more nearly constant with wide variations in current in the primary of the transformer 23. Ordinarily this will not be necessary for the purpose of keeping constant the duration of the firing of tube 21, but it will reduce the impedance of the transformer 23 in the meter circuit which is desirable for the purpose of keeping the burden on transformer 16 low and its accuracy high. The use of a resistance at 24 having the negative impedance current characteristics mentioned may also make it possible to employ valves at 21 which would otherwise be unsuitable. Such resistance may be made in accordance with United States Patent No. 1,822,742, September 8, 1931 to McEachron.

In Fig. 5 the current impulses which are proportional to the voltage are supplied through a plate modulated oscillator having electron discharge power triode tube 25. The plate circuit of tube 25 is supplied by a voltage proportional to the voltage of line 15 through a transformer 17a, a rectifier 29 of the tube variety and a filter 20. 30 represents a transformer having a primary winding 31 in the plate circuit of the oscillator and a secondary winding 32 connected to supply alternating current impulses to the voltage magnet 13 of the watthour meter. Firing of the oscillator is synchronized with the line current through the transformer 23 in the secondary of which is contained a resistance 33 and a condenser 34 coupled to the control grid of the oscillator tube. This control circuit also produces modulation of the plate voltage of the oscillator tube through the transformer coupling coils 35 and 31. As a result, the oscillator output is in fixed phase relation with the current of line 15 and produces alternating current energization of voltage magnet 13 of the watthour meter proportional to line voltage. Over the narrow range of line voltage variation at which the oscillator will ordinarily operate, its response is linear.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. Apparatus responsive to the volt-amperes of an alternating current circuit comprising a meter having current and voltage energizing coils, an armature responsive to the product of the flux of said coils, means for supplying one coil with alternating current which is proportional to the current of such circuit, and means for supplying the other coil with current impulses proportional to the voltage of such circuit which are in fixed phase relation with such alternating current, said last mentioned means including a rectifier for rectifying the voltage of said circuit and an electron discharge tube supplied from the output of said rectifier and having its conductivity controlled in synchronous relation with such alternating current.

2. Measuring apparatus responsive to volt-amperes comprising a meter element having current and voltage coils and an armature responsive to the product of the flux of said coils, means for supplying one coil by alternating current proportional to the current in a circuit to be metered and means for supplying the other coil by current impulses in fixed phase relation to said alternating current and proportional to the voltage of the circuit to be metered, said last mentioned means including rectifier means, an electron discharge device and means for controlling the intermittent operation of said electron discharge device to pass current to said other coil in fixed phase relation with said alternating current supply.

3. Apparatus for measuring the product of the volts and ampere quantities of an alternating current circuit comprising an alternating current wattmeter device having two windings, means for supplying alternating current proportional to one of said quantities to one of said windings, rectifier means for obtaining a direct current voltage proportional to the other of said quantities, an electron discharge tube through which the other winding is supplied from such direct current voltage, and means for controlling the operation of said discharge device so that it passes current impulses which are synchronous and in a fixed phase relation with such alternating current.

4. Apparatus for measuring the product of volt-amperes of an alternating current circuit comprising an induction wattmeter device having current and voltage windings, current connections for supplying alternating current proportional to the amperes of such circuit to said current winding, rectifier means for obtaining a direct current voltage proportional to the voltage of said circuit, a grid controlled electron discharge device through which said voltage winding is supplied from said direct current voltage, and a current transformer having an air gap in its core connected between said current connections and the grid of said electron discharge device for causing said electron discharge device to pass current impulses in synchronism and fixed phase relation with such alternating current.

5. Apparatus for measuring volt-ampere quantities of an alternating current circuit comprising an alternating current wattmeter having current and voltage windings, current connections for supplying alternating current to said current winding proportional to the current of said circuit, a rectifier for obtaining a voltage proportional to the voltage of said circuit, an oscillator including an electron discharge tube supplied from said direct current voltage and supplying said voltage windings, and means controlled by the phase of the current supplied to said current winding for determining the frequency and phase relation of the output of said oscillator.

6. Apparatus for obtaining current impulses in fixed phase relation with the current and proportional to the voltage of a variable power factor alternating current circuit comprising rectifier means for obtaining a direct current voltage proportional to the circuit voltage, a grid controlled electron discharge device supplied from such direct current voltage, and a current transformer having a primary winding energized in proportion to and in phase with the circuit current and a secondary winding coupled with the grid of said electron discharge device to control the conductivity thereof in synchronism with and in flexed phase relation with the circuit current.

THOMAS A. ABBOTT.